(12) United States Patent
Bardagjy

(10) Patent No.: US 11,080,874 B1
(45) Date of Patent: Aug. 3, 2021

(54) APPARATUSES, SYSTEMS, AND METHODS FOR HIGH-SENSITIVITY ACTIVE ILLUMINATION IMAGING

(71) Applicant: FACEBOOK TECHNOLOGIES, LLC, Menlo Park, CA (US)

(72) Inventor: Andrew Matthew Bardagjy, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/863,677

(22) Filed: Jan. 5, 2018

(51) Int. Cl.
*G02B 5/20* (2006.01)
*G06T 7/521* (2017.01)
*G02B 27/00* (2006.01)
*G02B 13/14* (2006.01)

(52) U.S. Cl.
CPC ............... *G06T 7/521* (2017.01); *G02B 5/201* (2013.01); *G02B 5/208* (2013.01); *G02B 13/146* (2013.01); *G02B 27/0075* (2013.01); *G06T 2207/10048* (2013.01)

(58) Field of Classification Search
CPC .......... G06T 7/521; G06T 2207/10048; G02B 13/146; G02B 5/208; G02B 5/201; G02B 27/0075
See application file for complete search history.

(56) References Cited

U.S. PATENT DOCUMENTS

| | | | | |
|---|---|---|---|---|
| 2004/0184385 | A1* | 9/2004 | Katsuma | G11B 7/1374 369/118 |
| 2010/0066854 | A1* | 3/2010 | Mather | G02B 5/005 348/222.1 |
| 2010/0103371 | A1* | 4/2010 | Sarver | A61F 2/1637 351/159.01 |
| 2013/0235250 | A1* | 9/2013 | Fainstain | H04N 5/232127 348/345 |
| 2015/0309225 | A1* | 10/2015 | Moore | G02B 5/201 359/634 |
| 2016/0210509 | A1* | 7/2016 | Hanna | G02B 13/146 |
| 2016/0286199 | A1* | 9/2016 | Wajs | H04N 13/236 |
| 2016/0344996 | A1* | 11/2016 | Olilla | H04N 13/254 |
| 2017/0034456 | A1* | 2/2017 | Kyung | H04N 5/2256 |
| 2017/0140221 | A1* | 5/2017 | Ollila | G06K 9/2018 |
| 2018/0131853 | A1* | 5/2018 | Pellman | G02B 13/14 |

* cited by examiner

*Primary Examiner* — Brian P Yenke
*Assistant Examiner* — Humam M Satti
(74) *Attorney, Agent, or Firm* — FisherBroyles, LLP

(57) ABSTRACT

A disclosed imaging device may include an image sensor, a lens system, and an aperture filter. The aperture filter may include a first concentric region that passes light of a first wavelength range and that blocks light of a second wavelength range and a second concentric region that passes light of the first wavelength range and light of the second wavelength range. The lens system may direct received light through the aperture filter toward the image sensor. The lens system and the aperture filter may provide a first depth-of-field associated with the first wavelength range and a second depth-of-field associated with the second wavelength range. Associated systems and methods are also disclosed.

20 Claims, 8 Drawing Sheets

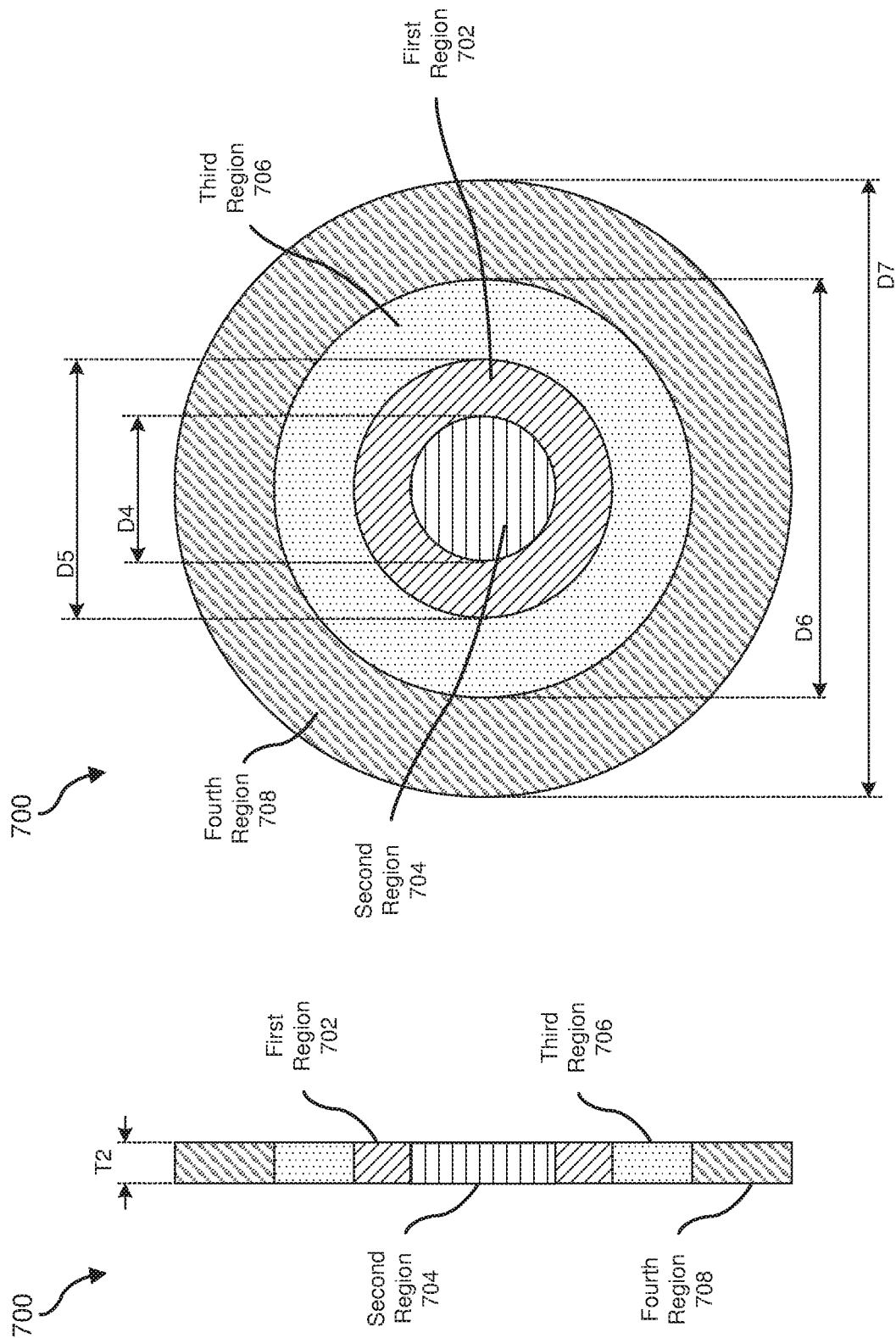

APPARATUSES, SYSTEMS, AND METHODS FOR HIGH-SENSITIVITY ACTIVE ILLUMINATION IMAGING

BACKGROUND

Augmented reality and virtual reality systems may rely on imaging systems, such as cameras, for many different applications including depth sensing. A conventional depth sensing device in such systems may project light into an area and determine the depth of objects within the area based on light backscattered or reflected from the objects after the light has been projected. However, background ambient light and/or light of specific wavelength bands (e.g., infrared light) may interfere with depth sensing device measurements. Additionally, different depth sensing modalities may be desirable to use to determine information about the portion of the imaging environment that is nearby the camera and to determine information about the portion of the imaging environment that is further away from the camera. Thus, the instant disclosure identifies and addresses a need for improved apparatuses, systems, and methods for producing information describing a local environment and/or objects in that environment, in augmented and virtual reality applications.

SUMMARY

As will be described in greater detail below, the instant disclosure describes an imaging system that can provide for different hyperfocal distances or different depths of field for different wavelength ranges to improve focus in the near-field and increased sensitivity in the mid-field. An imaging device may include an image sensor, an aperture filter, and a lens system. The aperture filter may have a plurality of concentric regions including a first concentric region that passes light of a first wavelength range and that blocks light of a second wavelength range and a second concentric region that passes light of the first wavelength range and light of the second wavelength range. The lens system may direct received light through the aperture filter toward the image sensor. The lens system and the aperture filter may provide a first depth-of-field associated with the first wavelength range and a second depth-of-field associated with the second wavelength range.

Some exemplary implementations of the imaging device may include one or more of the following features. The lens system may include two sets of lenses, and the aperture filter may be disposed in between the first set of lenses and the second set of lenses. The aperture filter may further include a third concentric region that is opaque to light of the first wavelength range and light of the second wavelength range. The aperture filter may further include a third concentric region that passes light of a third wavelength range. The first wavelength range and the second wavelength range may both be within the third wavelength range. The third wavelength range may include or be the visible wavelength spectrum. The first concentric region may have a first diameter, the second concentric region may have a second diameter, and the third concentric region may have a third diameter that is larger than the first diameter and larger than the second diameter.

Other exemplary implementations may include one or more of the following features. The first concentric region that passes light of the first wavelength range may have a first diameter and the second concentric region that passes light of the first and second wavelength ranges may have a second diameter. The first diameter may be greater than the second diameter such that the first diameter results in a lower effective f-number for light in the first wavelength range than the second diameter results in for light in the second wavelength range. The first wavelength range may be centered around about 850 nanometers and the second wavelength range may be centered around about 940 nm.

An exemplary system may include a head-mounted display and an imaging device. The imaging device may include an image sensor, an aperture filter, and a lens system. The aperture filter may have a plurality of concentric regions including a first concentric region that passes light of a first wavelength range and that blocks light of a second wavelength range and a second concentric region that passes light of the first wavelength range and light of the second wavelength range. The lens system may direct received light through the aperture filter toward the image sensor. The lens system and the aperture filter ay provide a first depth-of-field associated with the first wavelength range and a second depth-of-field associated with the second wavelength range.

Some exemplary implementations may include one or more of the following features. The image sensor, the lens system, and the aperture filter may be disposed within an imaging device housing that may be coupled to at least one of the head-mounted display of a virtual reality headset or an augmented reality headset and an external sensor device.

The exemplary system may further include a hand-held controller that includes at least one light-emitting element that emits light in the first wavelength range. The imaging device may include part of a local area imaging assembly that may track the hand-held controller based on the light emitted by the at least one light-emitting element of the hand-held controller. The exemplary system may further include a projector system that directs light of the second wavelength range into an imaging environment. The projector system may direct the light of the second wavelength range into the imaging environment as a two-dimensional pattern of light regions. The plurality of concentric regions may further include a third concentric region that passes light of a third wavelength range. At least one of the plurality of concentric regions may be annular in shape. The second wavelength range may have a longer wavelength than the first wavelength range.

In another example, a method for utilizing the disclosed devices and systems may include receiving light at an image sensor and through a lens system and an aperture filter. The aperture filter may have a plurality of concentric regions including a first concentric region that passes light of a first wavelength range and blocks light of a second wavelength range and a second concentric region that passes light of the first wavelength range and light of the second wavelength range. The image sensor may generate electronic signals associated with the first and second wavelength ranges. The lens system may direct received light through the aperture filter toward the image sensor such that the lens system and the aperture filter provide a first depth-of-field associated with the first wavelength range and a second depth-of-field associated with the second wavelength range. The method may further include processing the electronic signals associated with the first wavelength range according to a first computer-vision scheme and processing the electronic signals associated with the second wavelength range according to a second computer-vision scheme.

Some implementations may further include one or more of the following features. At least one of the first and second wavelength ranges may be outside the visible wavelength spectrum. Processing the electronic signals associated with the second wavelength range according to the second computer-vision scheme may include processing the electronic signals associated with the first wavelength range according to the second computer-vision scheme.

In some examples, the above-described method may be encoded as computer-readable instructions on a computer-readable medium. For example, a computer-readable medium may include one or more computer-executable instructions that when executed by at least one processor of a computing device, may cause the computing device to execute one or more steps of a method that may include processing the electronic signals associated with the first wavelength range according to a first computer-vision scheme and processing the electronic signals associated with the second wavelength range according to a second computer-vision scheme.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 7A and 7B are cross-sectional and top view diagrams of the aperture filter of FIG. 5, according to some embodiments.

Figure 1:
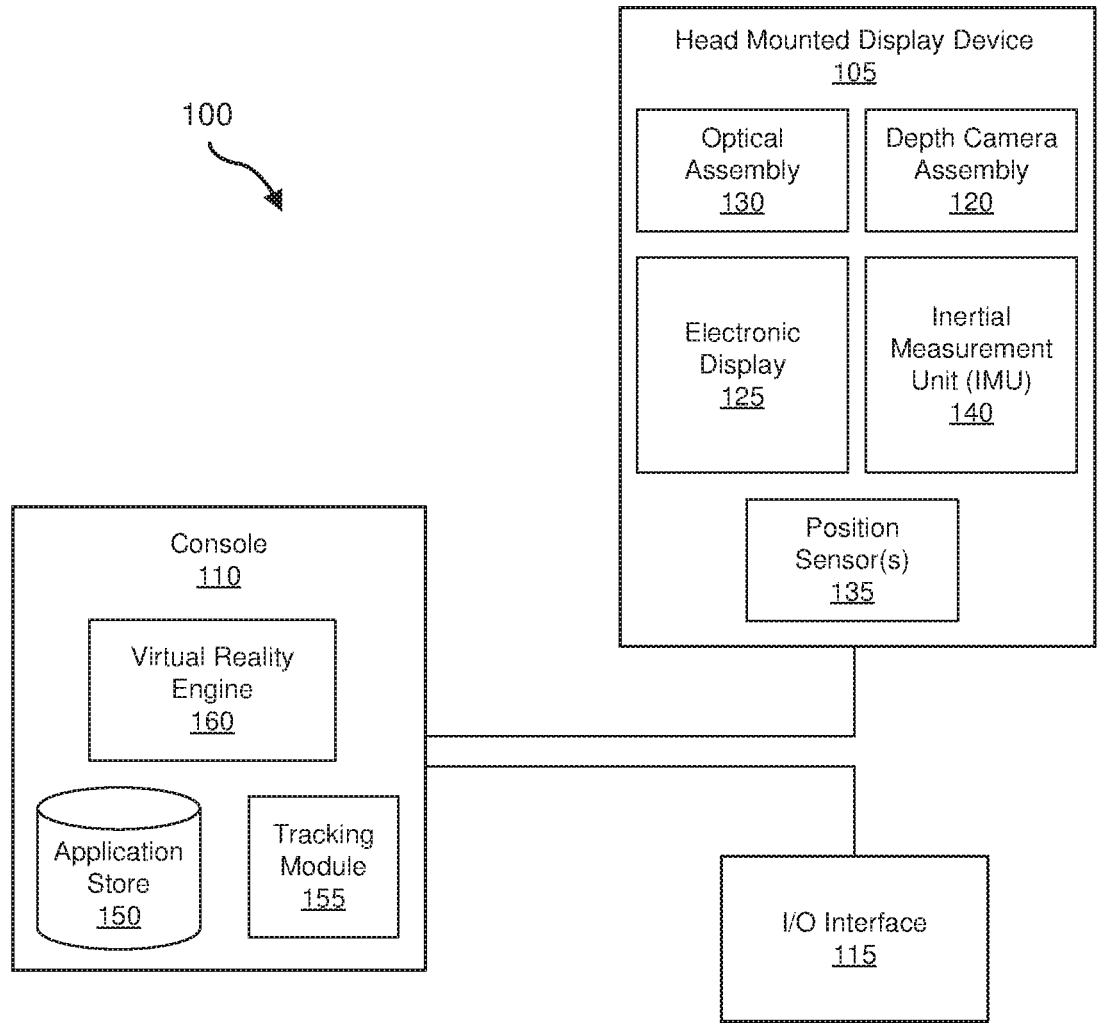
FIG. 1 is a block diagram of a head-mounted display (HMD) system including a console, an HMD device, and an input/output (I/O) interface, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to an imaging device and systems and methods involving such an imaging device. As will be explained in greater detail below, embodiments of the present disclosure may include an imaging device having an image sensor, an aperture filter, and a lens system. The aperture filter may include a plurality of concentric regions, including a first concentric region that passes light of a first wavelength range and a second concentric region that passes light of the first wavelength range in addition to light of a second wavelength range. The lens system may direct received light toward the image sensor. The lens system and the aperture filter may provide a first depth-of-field associated with the first wavelength range and a second depth-of-field associated with the second wavelength range. Accordingly, the second wavelength range may be in focus closer to the imaging device than the first wavelength range such that aspects of the local environment that are closer to the imaging device may be more accurately detected in signals derived from the second wavelength range, while the first wavelength range may be relied on for detection of the more distant aspects of the local environment.

The following will provide, with reference to FIGS. 1-8, detailed descriptions of systems and devices for providing high-sensitivity, active-illumination imaging with an extended working range. The systems and devices may utilize an optical filtering device referred to herein as an aperture filter. The aperture filter included in the imaging systems may provide different f-numbers for different wavelength of light received by an imaging system such that the different wavelength ranges each correspond to a different depth-of-field. This may allow for multi-range imaging for a single computer-vision scheme, such as time-of-flight (ToF) active stereo and/or other approaches that provide for in focus near-field and mid-field imaging.

FIG. 1 is a block diagram of one embodiment of an HMD system 100 in which a console 110 operates. The HMD system 100 may operate in a virtual reality (VR) system environment, an augmented reality (AR) system environment, a mixed reality (MR) system environment, or some combination thereof. The HMD system 100 shown in FIG. 1 may include an HMD 105 and an input/output (I/O) interface 115 that is coupled to the console 110.

While FIG. 1 shows an example HMD system 100 that includes at least one HMD 105 and at least one I/O interface 115, in other embodiments any number of these components may be included in the HMD system 100. For example, there may be multiple HMDs 105 each having an associated I/O interface 115, with each HMD 105 and I/O interface 115 communicating with the console 110. In alternative configurations, different and/or additional components may be included in the HMD system 100. Additionally, functionality described in conjunction with one or more of the components shown in FIG. 1 may be distributed among the components in a different manner than described in conjunction with FIG. 1 in some embodiments. For example, some or all of the functionality of the console 110 may be provided by the HMD 105.

The HMD 105 is a head-mounted display that presents content to a user including virtual views of an artificially rendered world environment and/or augmented views of a physical, real-world environment, augmented with computer-generated elements (e.g., two-dimensional (2D) or three-dimensional (3D) images, 2D or 3D video, sound, etc.). In some embodiments, the HMD 105 may be a "heads-up" display that is not attached to the user, but has another support that places the HMD 105 within the view of the user. In some embodiments, the presented content may include audio that is presented via an external device (e.g., speakers and/or headphones) that receives audio information from the HMD 105, the console 110, or both, and presents audio data based on the audio information. In some embodiments, such speakers and/or headphones may be integrated into or releasably coupled or attached to the HMD 105. The HMD 105 may include one or more bodies, which may be rigidly or non-rigidly coupled together. A rigid coupling between rigid bodies may cause the coupled rigid bodies to act as a single rigid entity. In contrast, a non-rigid coupling between rigid bodies may allow the rigid bodies to move relative to each other. An embodiment of the HMD 105 is the HMD 200 shown in FIG. 2 and described in further detail below.

The HMD 105 may include a depth camera assembly (DCA) 120 (or depth camera system), an electronic display 125, an optical assembly 130 (also referred to as an optics block 130), one or more position sensors 135, and an inertial measurement unit (IMU) 140. Other embodiments of the HMD 105 may include an optional eye tracking system configured to track the eyes of a user of the HMD 105, an optional varifocal module configured to adjust focus of one or more images displayed on the electronic display 125 based on the determined eye tracking information obtained from the eye tracking system, and other components. Some embodiments of the HMD 105 may have different components than those described in conjunction with FIG. 1. Additionally, the functionality provided by various components described in conjunction with FIG. 1 may be differently distributed among the components of the HMD 105 in other embodiments.

The DCA 120 may capture data describing depth information characterizing a local area surrounding some or all of the HMD 105 and/or characterizing a position or velocity of the DCA 120 (and thereby of the HMD 105) within the local area. The DCA 120 can compute the depth information using collected data (e.g., based on captured light according to one or more computer-vision schemes or algorithms, by processing a portion of a structured light pattern, by time-of-flight (ToF) imaging, by simultaneous localization and mapping (SLAM), etc.) or the DCA 120 can transmit this data to another device such as the console 110 that can determine the depth information using the data from the DCA 120. To enable or augment such computer-vision schemes, the DCA 120 may include a projector device, described herein in greater detail. Additionally, embodiments of the DCA 120 are included in FIGS. 4 and 7, which are described in further detail below.

The electronic display 125 may display two-dimensional or three-dimensional images to the user in accordance with data received from the console 110. In various embodiments, the electronic display 125 may include a single electronic display or multiple electronic displays (e.g., a display for each eye of a user). Examples of the electronic display 125 include: a liquid crystal display (LCD), an organic light-emitting diode (OLED) display, an inorganic light-emitting diode (ILED) display, an active-matrix organic light-emitting diode (AMOLED) display, a transparent organic light-emitting diode (TOLED) display, some other display, or some combination thereof. In some embodiments, the electronic display 125 may represent an embodiment of the electronic display 306 in FIG.

The optical assembly 130 may magnify image light received from the electronic display 125, correct optical errors associated with the image light, and present the corrected image light to a user of the HMD 105. The optical assembly 130 may include a plurality of optical elements. Example optical elements included in the optical assembly 130 include: an aperture, a Fresnel lens, a convex lens, a concave lens, a filter, a reflecting surface, and/or any other suitable optical element that affects image light. Moreover, the optical assembly 130 may include combinations of different optical elements. In some embodiments, one or more of the optical elements in the optical assembly 130 may have one or more coatings, such as partially reflective or anti-reflective coatings. In some embodiments, the optical assembly 130, or one or more components thereof, may be integrated into the electronic display 125.

The IMU 140 may, in some examples, represent an electronic device that generates data indicating a position of the HMD 105 based on measurement signals received from one or more of the position sensors 135 and/or from depth information received from the DCA 120. For example, a position sensor 135 may generate one or more measurement signals in response to motion of the HMD 105. Examples of position sensors 135 include: one or more accelerometers, one or more gyroscopes, one or more magnetometers another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 may generate data indicating an estimated current position and/or orientation of the HMD 105 relative to an initial position and/or orientation of the HMD 105. For example, the position sensors 135 may include multiple accelerometers to measure translational motion (forward/back, up/down, left/right) and multiple gyroscopes to measure rotational motion (e.g., pitch, yaw, roll).

The I/O interface 115 may represent a device that allows a user to send action requests and receive responses from the console 110. An action request may, in some examples, represent a request to perform a particular action. For example, an action request may be an instruction to start or end capture of image or video data or an instruction to perform a particular action within an application. The I/O interface 115 may include one or more input devices. Example input devices include: a keyboard, a mouse, a hand-held controller, or any other suitable device for receiving action requests and communicating the action requests to the console 110. An action request received by the I/O interface 115 may be communicated to the console 110, which may perform an action corresponding to the action request. In some embodiments the I/O interface 115 includes an IMU 140 that captures calibration data indicating an estimated position of the I/O interface 115 relative to an initial position of the I/O interface 115. In some embodiments, the I/O interface 115 may provide haptic feedback to the user in accordance with instructions received from the console 110 and/or the HMD 105. For example, haptic feedback may be provided when an action request is received, or the console 110 communicates instructions to the I/O interface 115 causing the I/O interface 115 to generate haptic feedback when the console 110 performs an action.

The console 110 may provide content to the HMD 105 for processing in accordance with information received from one or more of: the DCA 120, the HMD 105, and the I/O interface 115. In the example shown in FIG. 1, the console 110 includes a virtual and/or artificial reality engine 160, an application store 150, and a tracking module 155. Some embodiments of the console 110 have different modules or components than those described in conjunction with FIG. 1.

Similarly, the functions further described below may be distributed among components of the console 110 in a different manner than described in conjunction with FIG. 1.

The application store 150 may store one or more applications for execution by the console 110. An application may, in some examples, represent a group of instructions that, when executed by a processor, generates content for presentation to the user. Content generated by an application may be in response to inputs received from the user via movement of the HMD 105 or the I/O interface 115. Examples of applications include: gaming applications, conferencing applications, video playback applications, or other suitable applications. The application store 150 may be a non-transitory memory store that also stores data obtained from the DCA 120 or from other sources included in the HMD 105 or received from the console 110.

The tracking module 155 may calibrate the HMD system 100 using one or more calibration parameters and may adjust one or more calibration parameters to reduce error in determination of the position of the HMD 105 or of the I/O interface 115. For example, the tracking module 155 may communicate a calibration parameter to the DCA 120 to adjust the focus of the DCA 120 to more accurately determine positions of structured light elements captured by the DCA 120. Calibration performed by the tracking module 155 may also account for information received from the IMU 140 in the HMD 105 and/or an IMU 140 included in the I/O interface 115. Additionally, if tracking of the HMD 105 is lost (e.g., the DCA 120 loses line of sight of at least a threshold number of structured light elements), the tracking module 155 may recalibrate some or all of the HMD system 100.

The tracking module 155 may track movements of the HMD 105 or of the I/O interface 115 using information from the DCA 120, the one or more position sensors 135, the IMU 140, or some combination thereof. For example, the tracking module 155 may determine a position of a reference point of the HMD 105 in a mapping of a local area based on information from the HMD 105. The tracking module 155 may also determine positions of the reference point of the HMD 105 or a reference point of the I/O interface 115 using data indicating a position of the HMD 105 from the IMU 140 or sing data indicating a position of the I/O interface 115 from an IMU 140 included in the I/O interface 115, respectively. Additionally, in some embodiments, the tracking module 155 may use portions of data indicating a position and/or orientation of the HMD 105 from the IMU 140 as well as representations of the local area from the DCA 120 to predict a future location of the HMD 105. The tracking module 155 may provide the estimated or predicted future position of the HMD 105 or the I/O interface 115 to the engine 160.

The engine 160 may generate a three-dimensional mapping or multiple three-dimensional mappings of the area surrounding some or all of the HMD 105 (i.e., the "local area") based on information received from the HMD 105 or from components thereof, such as the DCA 120, which may be decoupled from the HMD 105 in some embodiments. In some embodiments, the engine 160 may determine depth information for the three-dimensional mapping of the local area based on information received from the DCA 120 that is relevant for techniques used in computing depth. The engine 160 may calculate depth information using one or more techniques in computing depth from structured light or unstructured light. In various embodiments, the engine 160 may use the depth information to, e.g., generate or update a model of the local area, and generate content based in part on the model.

The engine 160 may also execute applications within the HMD system 100 and receive position information, acceleration information, velocity information, predicted future positions, or some combination thereof, of the HMD 105 from the tracking module 155. Based on the received information, the engine 160 may determine content to provide to the HMD 105 for presentation to the user. For example, if the received information indicates that the user has looked to the left, the engine 160 may generate content for the HMD 105 that corresponds to the user's movement in a virtual environment or in an environment augmenting the local area with additional content. Additionally, the engine 160 may perform an action within an application executing on the console 110 in response to an action request received from the I/O interface 115 and provide feedback to the user that the action was performed. The provided feedback may be visual or audible feedback via the HMD 105 or haptic feedback via the I/O interface 115.

In some embodiments, based on the eye tracking information (e.g., orientation of the user's eye) received from the eye tracking system, the engine 160 may determine resolution of the content provided to the HMD 105 for presentation to the user on the electronic display 125. The engine 160 may provide the content to the HMD 105 having a maximum pixel resolution on the electronic display 125 in a foveal region of the user's gaze, whereas the engine 160 may provide a lower pixel resolution in other regions of the electronic display 125, thus achieving less power consumption at the HMD 105 and saving computing cycles of the console 110 without compromising the visual experience of the user. In some embodiments, the engine 160 can further use the eye tracking information to adjust where objects are displayed on the electronic display 125 to prevent vergence-accommodation conflict.

Figure 2:
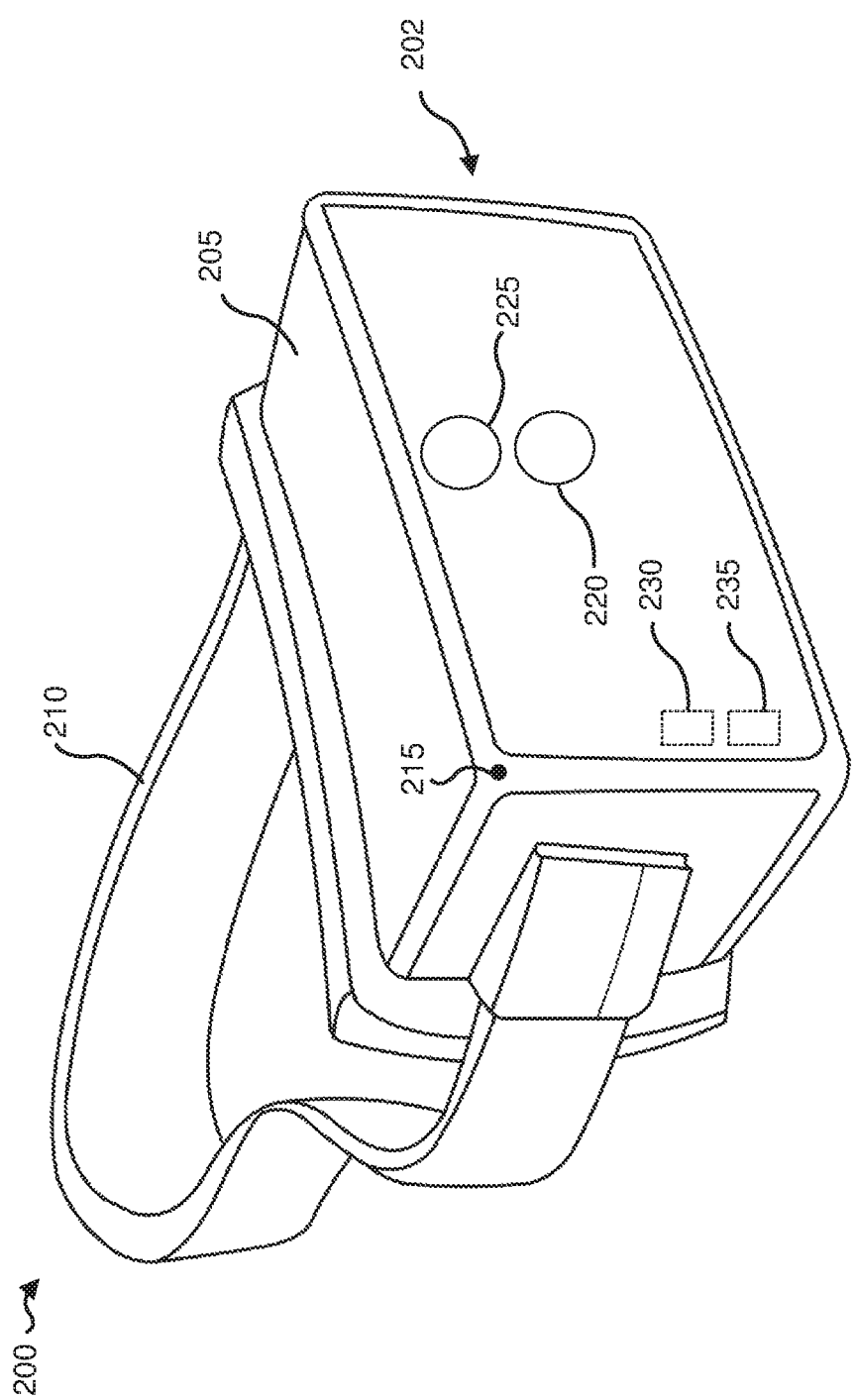
FIG. 2 is a diagram of an exemplary HMD of FIG. 1, according to an embodiment.

FIG. 2 is a diagram of an HMD 200, in accordance with one embodiment. The HMD 200 may include the imaging device and a depth camera assembly. The HMD 200 may be part of, e.g., a VR system, an AR system, an MR system, or some combination thereof. In embodiments that describe an AR system and/or an MR system, portions of a front side 202 of the HMD 200 may be at least partially transparent in the visible band (about 380 nm to about 750 nm), and portions of the HMD 200 that are between the front side 202 of the HMD 200 and an eye of the user may be at least partially transparent (e.g., a partially transparent electronic display). The HMD 200 may include a front rigid body 205, a band 210, and a reference point 215. The HMD 200 may also include a DCA with an imaging device 320 configured to determine depth information of a local area surrounding some or all of the HMD 200. In addition, the HMD 200 may include an imaging aperture 220 and an illumination aperture 225, and an illumination source of the DCA may emit light (e.g., structured light) through the illumination aperture 225. The imaging device of the DCA may capture light from the illumination source that is reflected or backscattered from the local area through the imaging aperture 220.

The front rigid body 205 may include one or more electronic display elements, one or more integrated eye tracking systems, an IMU 230, one or more position sensors 235, and one or more reference points 215. In the embodiment shown by FIG. 2, the position sensors 235 are located within the IMU 230, and neither the IMU 230 nor the position sensors 235 are visible to a user of the HMD 200. The IMU 230 may represent an electronic device that generates fast calibration data based on measurement signals received from one or more of the position sensors 235. The position sensor 235 may generate one or more measurement signals in response to motion of the HMD 200. Examples of the position sensors 235 include: one or more accelerometers, one or more gyroscopes, one or more magnetometers, another suitable type of sensor that detects motion, a type of sensor used for error correction of the IMU 230, or some combination thereof. The position sensors 235 may be located external to the IMU 230, internal to the IMU 230, or some combination thereof. The one or more reference points 215 may be utilized for tracking a position of the HMD 200 in a local area by, for example, the tracking module 155 of FIG. 1.

Figure 3:
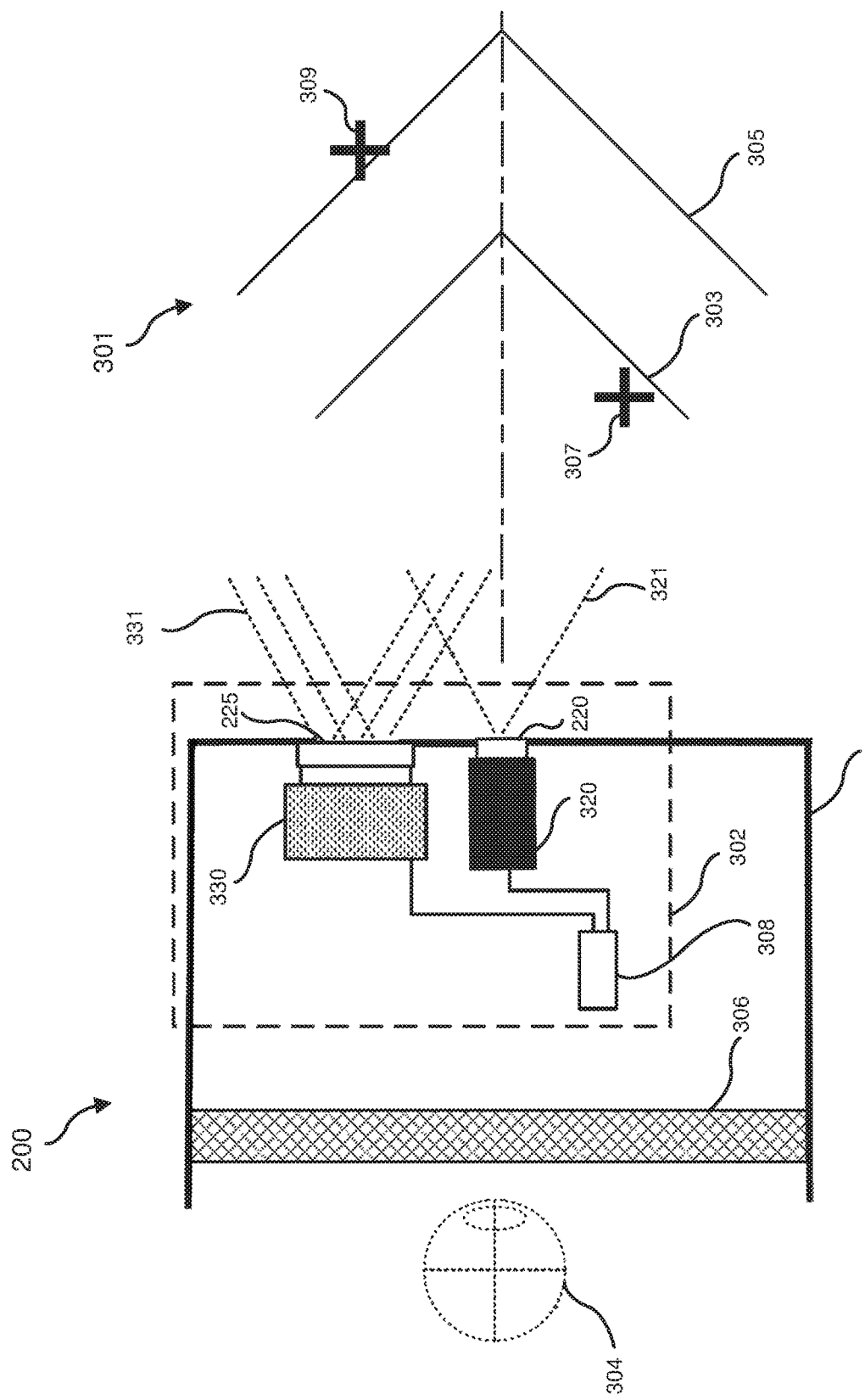
FIG. 3 is a cross-sectional diagram of a front rigid body of the HMD of FIG. 2, according to some embodiments.

FIG. 3 represents a cross section of the front rigid body 205 of the HMD 200 of FIG. 2. As shown in FIG. 3, the HMD 200 may include a local area imaging assembly 302. In some examples, the local area imaging assembly 302 (which may be an embodiment of the DCA 120 of FIG. 1) may be configured to capture image data that is utilized in determining, mapping, and/or tracking position, orientation, and/or movement of objects within an area, such as local environment or area 301 (e.g., an area in front based on the field of view of the local area imaging assembly 302). In some examples, the local area imaging assembly 302 may include the imaging device 320 configured to receive light produced in or reflected or backscattered from the local area 301 and a projector device 330 configured to emit light (i.e., a carrier signal) into the local area 301. The light may include a specific wavelength range, such as the visible wavelength spectrum or an infrared spectrum, etc.

As shown in FIG. 3, the local area 301 includes a near-field area 303 that is closer to the local area imaging assembly 302 than a mid-field area 305. For example, the near-field area 303 may be understood as beginning within approximately 10 centimeters (cm) to approximately 30 cm from the imaging assembly 302, in some embodiments. In other embodiments, the near-field area 303 may be an area approximately 10 cm to approximately 100 cm away from the imaging assembly 302. The mid-field area 305 may begin about 100 cm away from the imaging assembly 302 and extend to approximately 2 meters (m) away. In some embodiments, the mid-field area may extend to approximately 6 m from the imaging assembly 302. The near-field area 303 and the mid-field area 305 may additionally or alternatively include any other suitable regions including any suitable distances relative to the imaging assembly 302, without limitation. The near-field area 303 may overlap with the mid-field area 305 in some embodiments. As will be described in greater detail herein, an exemplary first object 307 is shown in the near-field area 303 and an exemplary second object 309 is shown in the mid-field area 305.

In some embodiments, the local area imaging assembly 302 may determine depth and/or surface information for objects within the local area 301 in a variety of ways. For example, the local area imaging assembly 302 may be utilized in a SLAM tracking system to identify and/or map features of the local area 301 and/or to identify a location, orientation, and/or movement of the HMD 200 and/or other objects (e.g., hand-held controllers, users etc.) in the local area 301. In some examples, the projector device 330 may emit light 331 as a structured light pattern (e.g., a symmetric and/or quasi-random dot pattern, a grid pattern, horizontal bars, etc.) into the local area 301. The emitted light 331 may have a wavelength range of 400 nm to about 2000 nm. In some embodiments, the emitted light 331 may have a narrower wavelength range, such as 800 nm to about 980 nm.

In these examples, the local area imaging assembly 302 may determine the depth and/or surface information based on triangulation or perceived deformation of the emitted pattern. Additionally or alternatively, the local area imaging assembly 302 may capture ToF information describing the time required for light emitted from the illumination source of the projector device 330 to be reflected from one or more objects in the local area 301 back to the imaging device 320, which collects reflected light 321. In this embodiment, the local area imaging assembly 302 may determine a distance between the local area imaging assembly 302 and the objects in the local area 301 based on the ToF information, including time delay and/or phase shift information.

In some examples, information collected by the local area imaging assembly 302 may be used as part of an image and/or video (e.g., an artificial reality image and/or video) displayed to a user wearing the HMD 200. In one example shown in FIG. 3, the image and/or video may be displayed to a user (e.g., via an eye 304 of the user) via the electronic display 306. The electronic display 306, which may be an embodiment of the electronic display 125 of FIG. 1, may represent a single electronic display or multiple electronic displays (e.g., a display for each eye of a user). Examples of the electronic display 306 may include without limitation, an LCD display, an OLED display, an ILED display, an AMOLED display, a TOLED display, a projector, a cathode ray tube, an optical mixer, and/or some combination thereof. The local area imaging assembly 302 may also include an imaging controller 308, which may be an image processor that is coupled to the projector device 330 and/or the imaging device 320.

Figure 4:
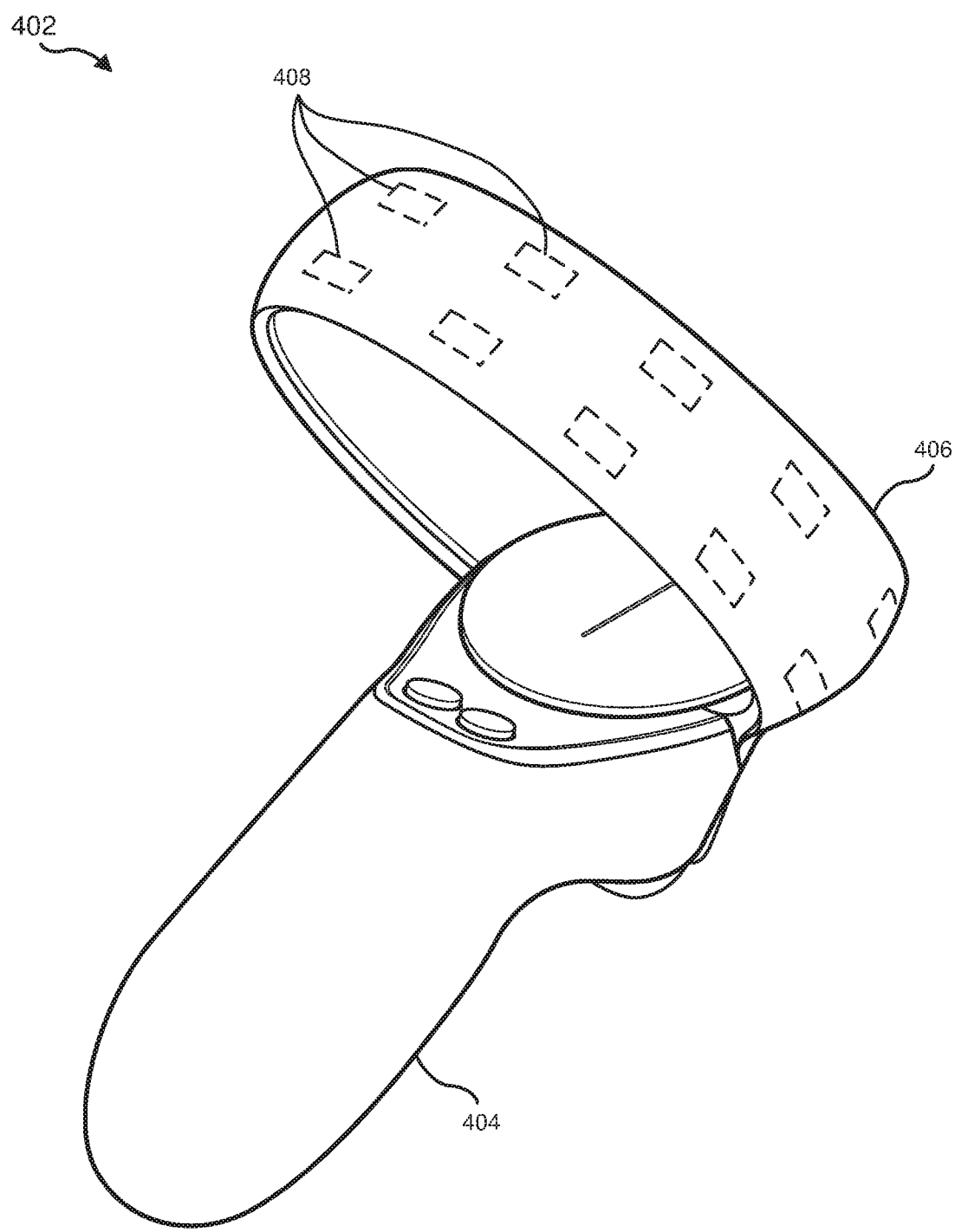
FIG. 4 is a perspective view of an exemplary hand-held controller utilized as the I/O interface of FIG. 1, according to some embodiments.

FIG. 4 is a perspective view of an exemplary hand-held controller 402 that may be included in the HMD system 100 of FIG. 1 as, or as part of, the I/O interface 115 in accordance with some embodiments. The HMD system 100 may include one or more hand-held controllers like the controller 402. For example, the HMD system 100 may include two hand-held controllers 402, with one hand-held controller 402 for each of a user's right and left hands. Each hand-held controller 402 may be communicatively coupled to the HMD 105 and/or to a computing device (e.g., a personal computer, the console 110, etc.) communicatively coupled to the HMD 105. The hand-held controller 402 may be communicatively coupled to the HMD 105 via any suitable wireless and/or wired connection.

As shown in FIG. 4, the hand-held controller 402 may include a grip 404 sized to fit within a user's hand. The hand-held controller 402 may also include a tracking loop 406 for tracking position, orientation, and/or movement of the hand-held controller 402 with respect to the HMD 105 and/or with respect to the local area 301. In some embodiments, the tracking loop 406 may include one or more tracking lights, such as array of tracking lights 408. The array of tracking lights 408 may include tracking LEDs (e.g., infrared (IR) LEDs), that are used for motion and positional tracking purposes to provide 360-degree motion control while using the HMD system 100. The controller 402 may additionally or alternatively include tracking lights on any other suitable portion of the controller 402. In some examples, the tracking lights 408 of the hand-held controller 402 may emit light having wavelengths greater than approximately 700 nm and less than approximately 900 nm. In one embodiment, the tracking lights 408 of the hand-held controller 402 may emit light having a wavelength of approximately 850 nm (e.g., between approximately 840 nm and 860 nm or between approximately 830 nm and 870 nm). In at least one embodiment, the imaging device 320 may receive light emitted by the tracking lights 408 on the hand-held controller 402, and the local area imaging assembly 302 may utilize the received light to determine location, orientation, and/or movement of the hand-held controller 402 relative to the HMD 105 or in another reference frame.

Returning to FIG. 3, the local area imaging assembly 302 may be utilized as part of a hybrid system that utilizes different wavelength ranges for the near-field area 303 and for the mid-field area 305, i.e., uses different wavelengths to image the first object 307 and the second object 309. In some embodiments, these different wavelength ranges are limited ranges within the larger near IR range, such as a first range around 850 nm and a second range around 940 nm, for example. Additionally, the imaging assembly 302 may use one wavelength range for SLAM imaging to locate, map, and/or track features of the local area 301 (e.g., using depth and/or surface information) and other wavelengths ranges (e.g., around 850 nm and around 940 nm) for tracking to determine location, orientation, and/or movement of one or more hand-held controllers 402 used by a user of the HMD system 100 and other objects or features of the local area 301. In use, the controller 402 may be present in the near-field area 303, such that the first object 307 may be understood to represent the controller 402 of FIG. 4 in the local area 301 of FIG. 3.

In some embodiments, the local area imaging assembly 302 may utilize light in a mostly visible band for SLAM imaging of the local area 301, including the near-field area 303 and the mid-field area 305. For example, the projector device 330 of the local area imaging assembly 302 may emit some light having wavelengths between approximately 400 nm to approximately 700 nm in to the local area 301 that is used for SLAM imaging. Additionally, the local area imaging assembly 302 may track at least one object in the local area 301 using light in a different wavelength range than light utilized in SLAM imaging as described above. For example, the local area imaging assembly 302 may receive and utilize light in an IR band (e.g., around 850 nm) for IR tracking of at least one hand-held controller 402. The imaging device 320 may receive and utilize the light emitted by the hand-held controller 402 (disposed within the near-field area 303) for tracking location, orientation, and/or movement of the hand-held controller 402 relative to the HMD 200 and/or the local area 301.

Figure 5:
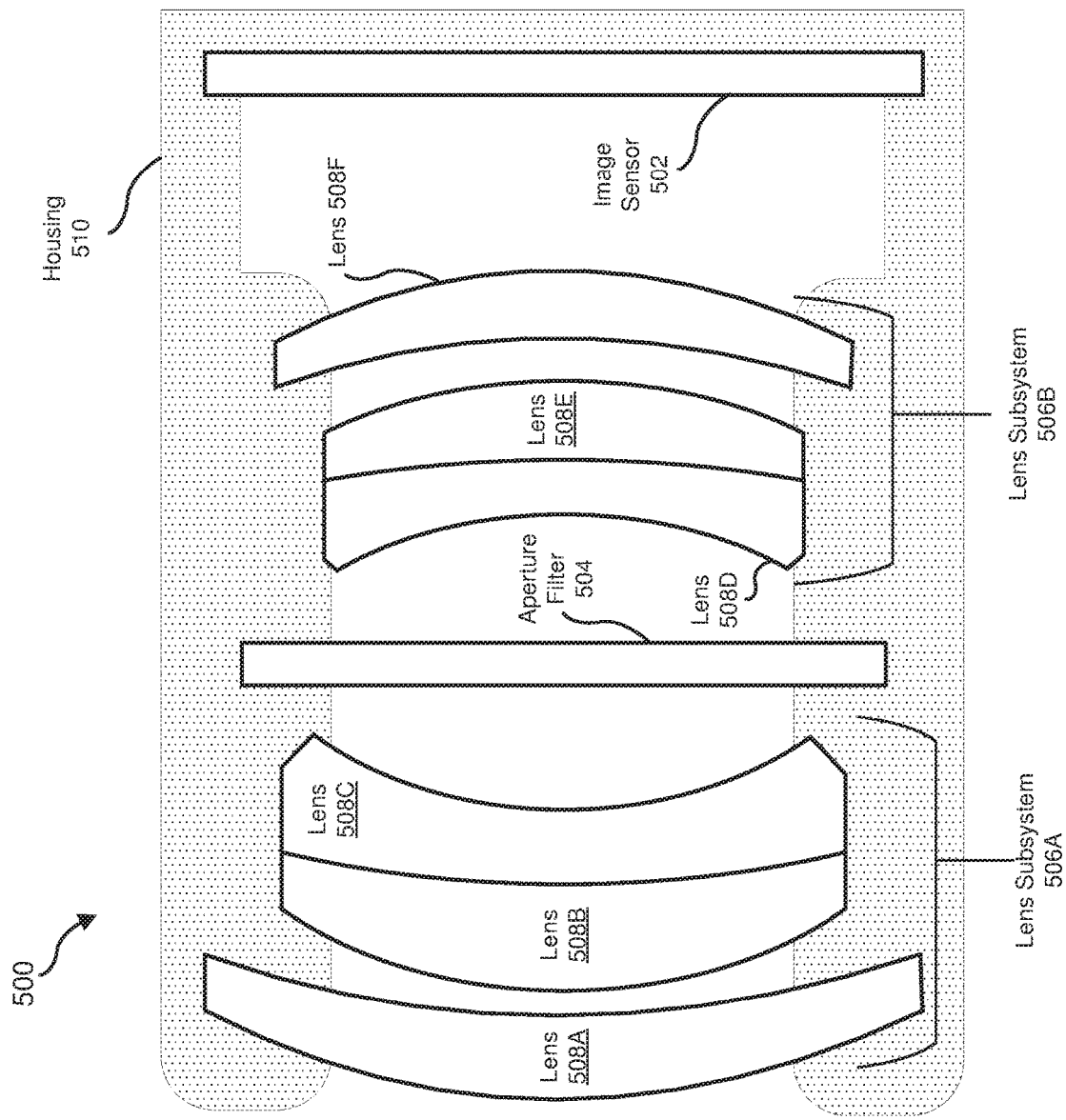
FIG. 5 is a cross-sectional diagram of an imaging system including an aperture filter, according to some embodiments.

FIG. 5 is a cross-sectional diagram of an imaging system 500 including an aperture filter, according to some embodiments. The imaging system 500 may be included in the imaging device 320 of FIG. 3 or in the DCA 120 of FIG. 1. For example, the imaging system 500 may be packaged in a module housing to provide the imaging device 320. As depicted in FIG. 5, the imaging system 500 may include an image sensor 502, which may be a complementary metal-oxide semiconductor (CMOS) image sensor, a charge-coupled device (CCD) image sensor, or any other suitable sensor that is capable of receiving light and encoding information from the received light in digital signals.

The imaging system 500 may further include an optical device referred to herein as an aperture filter 504. The aperture filter 504 may combine aspects of an aperture with aspects of a filter. More detail regarding embodiments of the aperture filter 504 are provided herein below. The aperture filter 504 may be disposed within a lens system 506 that includes a first lens subsystem 506A and a second lens subsystem 506B. As depicted in FIG. 5, the first lens subsystem 506A includes exemplary lenses 508A, 508B, and 508C and the second lens subsystem 506B includes exemplary lenses 508D, 508E, and 508F. The lenses 508A-F may be formed from glass or plastic, and may include layers formed thereon, such as thin-film layers that provide wavelength filters, antireflective coatings, etc. In some embodiments, the lens system 506 may be disposed entirely in between the aperture filter 504 and the image sensor 502. The image sensor 502, the aperture filter 504, and the lens system 506 may be secured in place within a module package or housing 510. The housing 510 may have openings to facilitate electrical connection to the HMD 200 and an electronic system thereof.

Figure 6B:
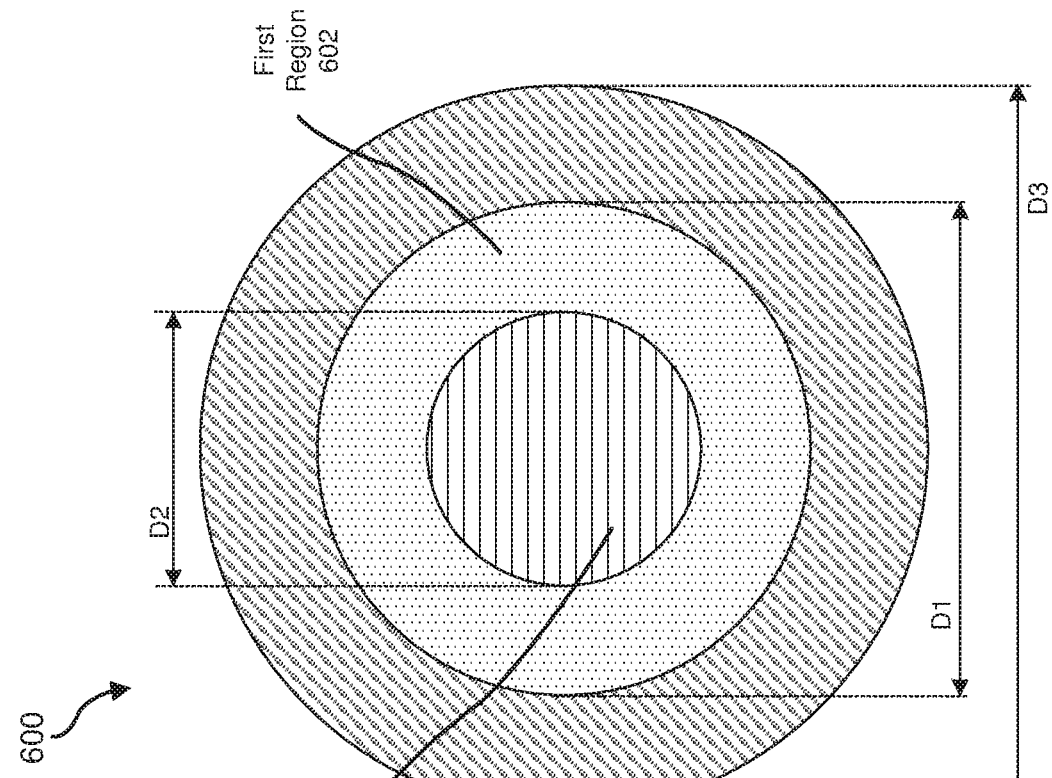
FIGS. 6A and 6B are cross-sectional and top view diagrams of the aperture filter of FIG. 5, according to some embodiments.
Figure 6A:
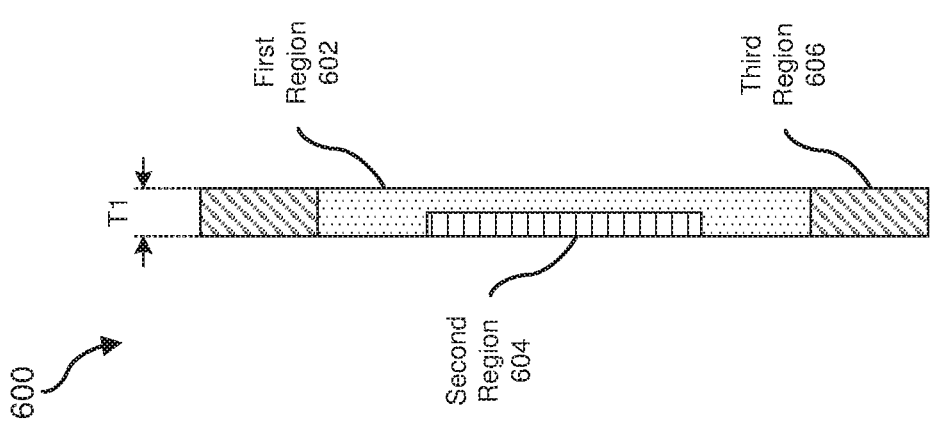

FIGS. 6A and 6B are cross-sectional and top view diagrams, respectively, of an embodiment of the aperture filter 504 of FIG. 5, referred to as aperture filter 600, according to some embodiments. The aperture filter 600 may include a plurality of concentric regions that block or inhibit at least some wavelength ranges. In at least one embodiment, the aperture filter 600 may include a first region 602 that passes light in a first wavelength range and blocks or inhibits light in a second wavelength range, while an included second region 604 may pass light in both the first wavelength range and the second wavelength range. The first wavelength range and the second wavelength range may each include any suitable wavelengths and/or range of wavelengths. For example, the first region 602 may pass a first wavelength range around 850 nm and may block or inhibit all other light wavelengths. In this example, the second region 604 may pass both the first wavelength range around 850 nm and a second wavelength range around 940, while blocking or inhibiting all other wavelengths outside of those ranges. The aperture filter 600 may further include a third region 606 that is effectively opaque to the first and second wavelength ranges around 850 nm and 940 nm, in addition to other wavelength ranges. In some embodiments, the second region 604 may pass light in a first wavelength range and may block or inhibit light in a second wavelength range, while the first region 602 may pass light in both the first wavelength range and the second wavelength range.

As can be seen in FIG. 6A, the aperture filter 600 may have a thickness T1. In some embodiments, the material that forms the second region 604, which may be a dichroic filter, may be inset into or be embedded within the material that forms the first region 602. In other embodiments, the material forming the second region 604 may be deposited, painted, and/or screen-printed onto the material that forms the first region 602. For example, the material that forms the first region 602 may include a portion of a substrate formed of any suitable material, such as a glass material, a polymer material (e.g., acrylic), and/or any other suitable substrate material, doped with a first dopant or set of dopants, while the second region 604 may be a glass substrate with a second dopant or set of dopants.

Alternatively or additionally, the first region 602 may be a substrate having a first thin-film deposited thereon while the second region 604 may be the same substrate having a second thin-film deposited thereon. In some embodiments, the second region 604 may include some portions with the first thin-film material deposited thereon and may further include some portions with the second thin-film material deposited thereon. By the design of the dichroic filter provided by the second region 604, a filter that provides for dual bandpass filtering may be utilized in the aperture filter 600. Alternatively and/or additionally, an absorptive filter component may be used for lowpass filtering and a dichroic coating component may be selectively applied over a portion of the absorptive filter. As an example, the first region 602 and the second region 604 may pass visible light and light having a wavelength of approximately 850 nm such that the first region 602 and the second region 604 may stop or inhibit light having wavelengths lower than 400 nm and higher than 880 nm and may also stop or inhibit light between about 700 nm and 830 nm. In some embodiments, the opaque third region 606 may include a light-blocking material, such as, for example, an opaque painted material on a substrate, a die cut or etched metal material, and/or any other suitable light-blocking material. In some embodiments, the opaque third region 606 may be provided by a structure that retains the substrate of the aperture filter 600 in place, and so may be a separable or integral part of a larger module package.

As shown in FIG. 6B, the first region 602 may have a diameter D1 and the second region 604 may have a diameter D2. As shown, the diameter D1 of the first region 602 may be greater than the diameter D2 of the second region 604. The diameter D3 of the opaque third region 606 may be greater than the diameters D1 and/or D2. Given the configuration depicted in FIGS. 6A and 6B, the hyperfocal distance associated with the second wavelength range may be reduced. For example, images or image data obtained using the wavelength range around 940 nm may have a satisfactory sharpness or focus closer to the imaging assembly 302 than images or image data obtained using the wavelength range around 850 nm. In this way, embodiments of the aperture filter 600 may optimize the imaging system 500 to collect data for computer-vision sensing for an area closer to the imaging system by having an effective focus closer for one wavelength than for another wavelength.

Because the effective aperture of the second wavelength range may be smaller, the sensitivity of the imaging system 500 to the second wavelength may be lesser but the hyperfocal distance may be shorter as well. Because the effective aperture of the first wavelength may be larger, the sensitivity of the imaging system 500 to the first wavelength range may be greater, but the hyperfocal distance may also be further. Accordingly, the imaging system 500 may be optimized for long-range or mid-range sensing with the first wavelength range and may also be optimized for short-range sensing with the second wavelength range. As an example, the different aperture diameters may result in f-numbers or focal ratios (f-ratios) of f/8 for the second wavelength range and ½ for the first wavelength range. The aperture diameters may be dimensioned such that they result in any other suitable f-numbers in the imaging system 500, without limitation.

FIGS. 7A and 7B are cross-sectional and top view diagrams, respectively, of an aperture filter 700. The aperture filter 700 may be another exemplary embodiment of the aperture filter 504 of FIG. 5, according to some embodiments. The aperture filter 700 may include a plurality of concentric regions that each block or inhibit at least some wavelength ranges. In at least one embodiment, the aperture filter 700 may include a first region 702 that passes light in a first wavelength range and blocks or inhibits light in a second wavelength range, while an included second region 704 may pass light in both the first wavelength range and the second wavelength range. As shown in FIG. 7B, the first region 702 may surround the second region 704, such that the first region 702 has an annular shape while the second region 704 has a disc shape.

In some embodiments, the aperture filter 700 may further include a third region 706 and a fourth region 708. The third region 706 may pass a third wavelength range of light and the fourth region 708 may be a region that is opaque to a broad spectrum of light, including visible and IR light. In some embodiments of the aperture filter 700, the opaque fourth region 708 may be provided by a structure that retains the substrate of the aperture filter 700 in place and so may be a separable or integral part of a larger module package.

As can be seen in FIG. 7A, the aperture filter 700 may have a thickness T2. In some embodiments, the material that forms the second region 704 may be inset into or be embedded within the material that forms the first region 702, such that it extends all the way through the thickness T2, as shown in FIG. 7A. In other embodiments, the material of the second region 704 may extend only partially through the thickness T2. The material that forms the first region 702 may include a portion of a substrate formed of any suitable material, such as a glass material, a polymer material (e.g., acrylic), and/or any other suitable substrate material, doped with a first dopant or set of dopants, while the second region 704 may be a portion of the substrate doped with a second dopant or set of dopants. Alternatively or additionally, the first region 702 may be a portion of the substrate having a first thin-film deposited thereon while the second region may be the same substrate having a second thin-film deposited thereon. In some embodiments, the second region 704 may include some portions with the first thin-film material deposited thereon and may further include some portions with the second thin-film material deposited thereon.

The first wavelength range, the second wavelength range, and the third wavelength range may each include any suitable wavelengths and/or range of wavelengths. As an example, the first region 702 may pass a wavelength range around 850 nm and may block or inhibit all other light wavelengths. In this example, the second region 704 may pass both the wavelength range around 850 nm and a wavelength range around 940 nm, while blocking or inhibiting all other light wavelengths outside of those ranges. These wavelength ranges may be the same or different. For example, the wavelength range around 850 nm may extend from 845 nm to 855 nm, from 840 nm to 860 nm from 835 nm to 865 nm, etc. The ranges for the wavelength range around 940 nm may be of similar widths. In some embodiment, the third region 706 may be transparent to at least a portion of the visible wavelength spectrum. For example, the third region may be a broadband pass region that passes light in a wavelength range from about 400 nm to about 750 nm and may block or inhibit all other light wavelengths. In some embodiments, the third region 706 may pass light in a wavelength range from about 400 nm to about 950 nm. Accordingly, at least some of the dopants present in and/or the thin-films present on the first and second regions 702 and 704 may be absent from the third region 706.

In such embodiments, the diameter D4 may define an effective aperture for light in the second wavelength range and the diameter D5 may define an effective aperture for the light in the first wavelength range. Accordingly, the imaging system 500 may be utilized to provide improved sharpness for imaged objects that are in the near-field area 303 (see FIG. 3) when utilizing the second wavelength range for imaging. Light in the second wavelength range may then be processed to determine depth information for objects present in the near-field area 303. Additionally, light in the first wavelength range may be processed to determine depth information for objects situated in the mid-field area 305. The diameter D5 and the diameter D6 may provide an effective aperture for visible light or for visible light plus light in at least a portion of the near-IR light spectrum according to some embodiments that provide for certain types of computer-vision imaging, such as SLAM imaging. When the first region 702 and the second region 704 are bandpass filter regions, much of the light passing through the third region 706 may pass through an annular-shaped aperture defined by the third region 706.

The annular-shaped aperture defined by the third region 706 may cause some distortion of the light passed through the third region 706. Such distortion may be addressed through image processing. Embodiments of the local area imaging assembly 302 of FIG. 3 that include embodiments of the imaging system 500 of FIG. 5, may not be suitable for general purpose photography or videography, but may be well adapted for use in depth sensing applications for AR, VR, and/or MR uses and for computer-vision.

In general, embodiments of the aperture filter 700 may provide for high sensitivity and a lower f-number for SLAM imaging, a mid-level sensitivity for tracking at the midrange, and lower sensitivity and increased sharpness for near-range active illumination imaging, whether for structured light or ToF imaging.

Figure 8:
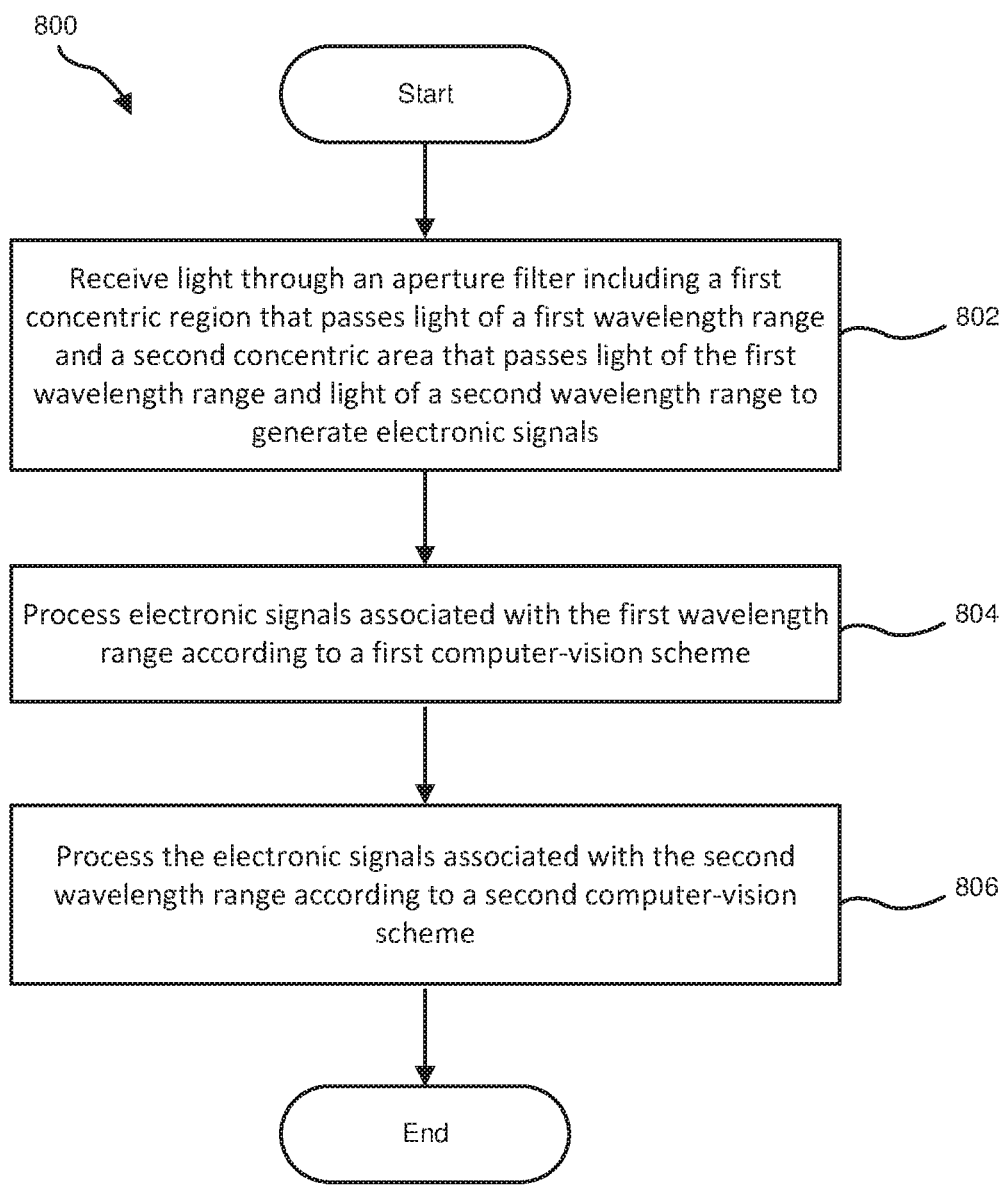
FIG. 8 is a flowchart of a method for utilizing light received through the aperture filter of FIG. 5, according to some embodiments.

FIG. 8 is a flowchart of a method 800 for utilizing light received through implementations of an aperture filter (e.g., aperture filters 504, 600, or 700 shown in FIG. 5-7B), according to some embodiments. At least a portion of one or more of the steps shown in FIG. 8 may be performed by any suitable computer-executable code and/or computing system, including the system(s) illustrated in FIGS. 1, 2, and 3. In one example, at least a portion of one or more of the steps shown in FIG. 8 may represent an algorithm whose structure includes and/or is represented by multiple sub-steps, examples of which will be provided in greater detail below.

As illustrated in FIG. 8, at step 802, an image sensor may receive light through a lens system and an aperture filter. For example, the image sensor 502 may receive light through the aperture filter 504 and the lens system 506 of FIG. 5.

The aperture filter may have a plurality of concentric regions including a first concentric region that passes light of a first wavelength range and that blocks light of a second wavelength range. The plurality of concentric regions of the aperture filter may further include a second concentric region that passes light of the first wavelength range and light of the second wavelength range. The image sensor may generate electronic signals associated with the first and second wavelength ranges. For example, the aperture filter may be an embodiment of the aperture filter 600 of FIG. 6 or the aperture filter 700 of FIG. 7.

The lens system may direct received light through the aperture filter toward the image sensor such that the lens system and the aperture filter provide a first depth-of-field associated with the first wavelength range and a second depth-of-field associated with the second wavelength range. For example, the lens system 506 of FIG. 5 may include the first lens subsystem 506A and the second lens subsystem 506B. The first lens subsystem 506A may include one or more lenses that direct the received light through the aperture filter 504 to the image sensor 502. As described herein, the aperture filter 504 includes regions that pass certain wavelengths of light while inhibiting, blocking, or preventing other wavelengths from passing therethrough. Accordingly, the diameter of the aperture filter 504 can vary according to the wavelength of light passing therethrough, such that the effective aperture depends on the wavelength of the light. The different apertures combined with a set or pre-set focal length of the lens system may provide an imaging system that includes the lens system and the aperture filter with different characteristics for different wavelength ranges.

At step 804, a processing device may process the electronic signals associated with the first wavelength range according to a first computer-vision scheme. For example, the controller 308 or a processing device of the HMD 105 or the console 110 may process the first wavelength range according to a ToF processing algorithm, an active stereo algorithm, or a structured light algorithm (see, e.g., FIGS. 1 and 3). In some embodiments, the first wavelength range may be centered around a first near-IR wavelength range (e.g., around 850 nm) and may be used for mid-range depth sensing.

At step 806, the processing device may process the electronic signals associated with the second wavelength range according to a second computer-vision scheme. For example, the controller 308 or a processing device of the HMD 105 or the console 110 may process the first wavelength range according to the same or another ToF, active stereo, or structured light algorithm. In some embodiments, the second wavelength range may be centered around a second near-IR wavelength range that is different from the first wavelength range (e.g., around 940 nm rather than 850 nm), Other wavelength ranges may be used in other embodiments, including other visible and non-visible wavelength ranges.

The different effective apertures provided by the aperture filters 504, 600, and/or 700 may provide different hyperfocal distances, which may enable different ranges of imaging sharpness. The imaging system 500 may allow for dual or multi-range ToF, active stereo, and structured light computer-vision schemes in a single device and may also allow for high sensitivity SLAM image processing with a long working range.

Embodiments of the present disclosure may allow for a single imaging system to have an extended range of operation, due to selected wavelength ranges having an effective aperture that allows for objects in closer proximity to the imaging system to be imaged with a sharper resolution while also allowing for increased sensitivity to wavelength ranges used to image objects that are further away in the local area or environment.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the sa variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data for an image sensor to be transformed, transform or process the image data, which may include three-dimensional characteristics of a local environment or an object within that local environment, output a result of the transformation to a processing device, use the result of the transformation to generate a three-dimensional map of the local environment and/or object, and store the result of the transformation to provide the map to other services and systems. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An imaging device comprising:
an image sensor;
an aperture filter having a plurality of concentric regions including:
  a first concentric region that passes light of a first wavelength range and a second wavelength range, the first concentric region having a first diameter;
  a second concentric region encompassed by the first concentric region, the second concentric region at least partially blocking light of the second wavelength range, the second concentric region having a second diameter; and
  a third concentric region opaque to light of the first wavelength range and the second wavelength range, the third concentric region having a third diameter; and
a lens system that directs received light through the aperture filter toward the image sensor, wherein:
  the third diameter is greater than the first diameter;
  the first diameter is greater than the second diameter;
  at least a portion of the received light that passes through the second concentric region subsequently passes through the first concentric region when directed towards the image sensor; and
  the lens system and the aperture filter provide a first depth-of-field associated with the first wavelength range and a second depth-of-field associated with the second wavelength range.

2. The imaging device of claim 1, wherein the lens system comprises two sets of lenses and wherein the aperture filter is disposed in between the first set of lenses and the second set of lenses.

3. The imaging device of claim 1, wherein the third concentric region passes light of a third wavelength range.

4. The imaging device of claim 3, wherein the third wavelength range comprises a visible wavelength spectrum.

5. The imaging device of claim 1, wherein the first diameter is greater than the second diameter such that the first diameter results in a lower effective f-number for light in the first wavelength range than the second diameter results in for light in the second wavelength range.

6. The imaging device of claim 1,
wherein the first wavelength range comprises a visible wavelength spectrum, and
wherein the second wavelength range is centered around about 850 nanometers.

7. The imaging device of claim 1, wherein the first concentric region is of a thickness such that material that forms the second concentric region may be embedded within material that forms the first concentric region.

8. The imaging device of claim 1, wherein material that forms the second concentric region is deposited onto material that forms the first concentric region.

9. The imaging device of claim 1, wherein the second concentric region comprises a dichroic filter.

10. A system comprising:
a head-mounted display; and
an imaging device that comprises:
an image sensor;
an aperture filter having a plurality of concentric regions including:
a first concentric region that passes light of a first wavelength range and a second wavelength range, the first concentric region having a first diameter;
a second concentric region encompassed by the first concentric region, the second concentric region at least partially blocking light of the second wavelength range, the second concentric region having a second diameter; and
a third concentric region opaque to light of the first wavelength range and the second wavelength range, the third concentric region having a third diameter; and
a lens system that directs received light through the aperture filter toward the image sensor, wherein:
the third diameter is greater than the first diameter;
the first diameter is greater than the second diameter;
at least a portion of the received light that passes through the second concentric region subsequently passes through the first concentric region when directed towards the image sensor; and
the lens system and the aperture filter provide a first depth-of-field associated with the first wavelength range and a second depth-of-field associated with the second wavelength range.

11. The system of claim 10, wherein the image sensor, the lens system, and the aperture filter are disposed within an imaging device housing that is coupled to at least one of:
the head-mounted display of a virtual reality headset or an augmented reality headset; or
an external sensor device.

12. The system of claim 10,
further comprising a hand-held controller that includes at least one light-emitting element that emits light in the first wavelength range; and
wherein the imaging device comprises part of a local area imaging assembly that tracks the hand-held controller based on the light emitted by the at least one light-emitting element of the hand-held controller.

13. The system of claim 10, further comprising a projector system that, directs light of the second wavelength range into an imaging environment.

14. The system of claim 13, wherein the projector system directs the light of the second wavelength range into the imaging environment as a two-dimensional pattern of light regions.

15. The system of claim 10, wherein the third concentric region passes light of a third wavelength range.

16. The system of claim 10, wherein at least one of the plurality of concentric regions is annular.

17. The system of claim 10, wherein the second wavelength range has a longer wavelength the first wavelength range.

18. A method comprising:
receiving light at an image sensor and through a lens system and an aperture filter, wherein:
the aperture filter has a plurality of concentric regions including:
a first concentric region that passes light of a first wavelength range and a second wavelength range, the first concentric region having a first diameter;
a second concentric region encompassed by the first concentric region, the second concentric region at least partially blocking light of the second wavelength range to generate electronic signals associated with the first and second wavelength ranges, the second concentric region having a second diameter; and
a third concentric region opaque to light of the first wavelength range and the second wavelength range, the third concentric region having a third diameter; and
the lens system directs received light through the aperture filter toward the image sensor, wherein:
the third diameter is greater than the first diameter;
the first diameter is greater than the second diameter;
at least a portion of the received light that passes through the second concentric region subsequently passes through the first concentric region when directed towards the image sensor; and
the received light is directed such that the lens system and the aperture filter provide a first depth-of-field associated with the first wavelength range and a second depth-of-field associated with the second wavelength range;
processing the electronic signals associated with the first wavelength range according to a first computer-vision scheme; and
processing the electronic signals associated with the second wavelength range according to a second computer-vision scheme.

19. The method of claim 18, wherein at least one of the first and second wavelength ranges is outside the visible wavelength spectrum.

20. The method of claim 18, wherein processing the electronic signals associated with the second wavelength range according to the second computer-vision scheme comprises processing the electronic signals associated with the first wavelength range according to the second computer-vision scheme.

* * * * *